J. R. GAMMETER.
TIRE VULCANIZING METHOD AND APPARATUS.
APPLICATION FILED APR. 18, 1921.

1,387,381. Patented Aug. 9, 1921.

Inventor
J. R. Gammeter
By Robert M Pierson
Atty.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-VULCANIZING METHOD AND APPARATUS.

1,387,381.     Specification of Letters Patent.     Patented Aug. 9, 1921.

Application filed April 18, 1921. Serial No. 462,162.

*To all whom it may concern:*

Be it known that I, JOHN R. GAMMETER, a citizen of the United States, residing at Akron, in the county of Summit and State of Ohio, have invented a certain new and useful Tire-Vulcanizing Method and Apparatus, of which the following is a specification.

This invention relates to methods and apparatus for vulcanizing or partially vulcanizing pneumatic tire casings or carcasses upon hollow tire-forming cores by the application of a heat-carrying fluid to the interior of the core.

My main objects are to provide an effective circulation of the heating fluid, to prevent the "blowing" of the rubber during the heating operation, and to furnish means adapted for quick insertion and removal of the work. My invention is especially well adapted for imparting a preliminary partial vulcanization to the carcass of a tire in order to set the rubber therein and prevent buckling and wrinkling of the carcass plies due to the pressure of the molding devices used during the final vulcanization.

Figure 1:
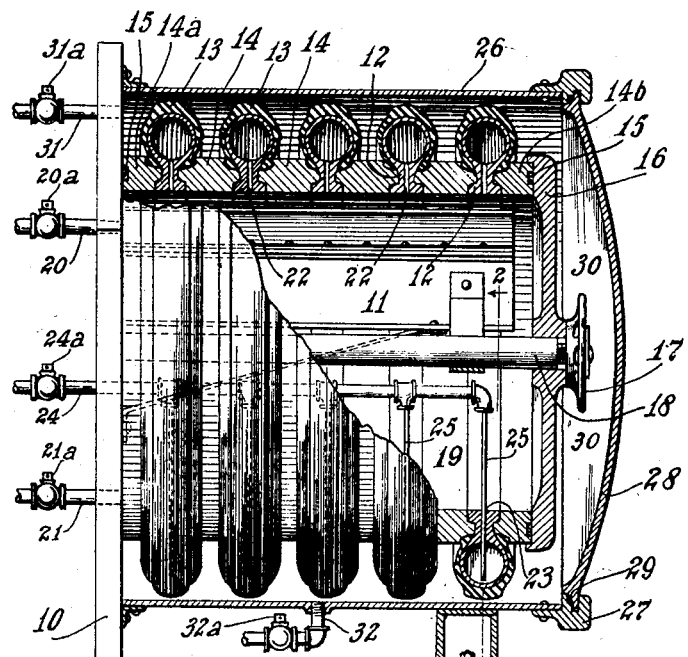
Figure 1 is a side elevation, partly in section, of a tire vulcanizing apparatus embodying and adapted to carry out my invention.
Figure 2:
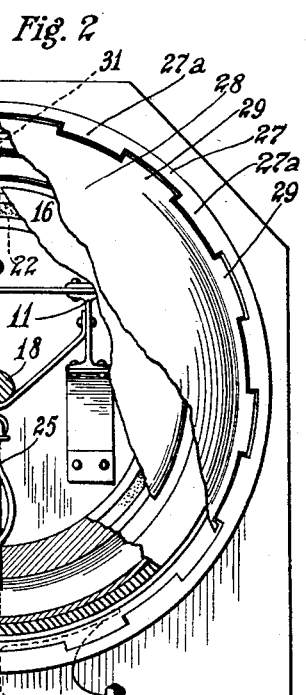
Fig. 2 is an end view of the same with parts broken away and parts in section on line 2—2 of Fig. 1.

Referring to the drawings:

10 is a stationary, vertical back plate from which horizontally extend two braced beams 11, 11 adapted pendularly to support in vertical positions, by engagement with the upper parts of their inner peripheries, a plurality of annular tire-forming cores 12, 12. 13, 13 are the respective tires mounted on said tire-forming cores and 14, 14 are large bead-molding and sealing rings mounted upon said beams 11 in the same fashion as the tire cores 13 and alternating therewith, said rings, excepting the two end ones, being formed with circumferential grooves at each side of their outer peripheries adapted to fit the adjacent beads of the tires 13 and form a seal therewith. The end rings 14$^a$ and 14$^b$ are formed with but one such circumferential groove, adapted to engage the adjacent bead of the nearest tire, and the opposite side faces of said rings are provided with gaskets 15, 15 adapted sealingly to contact respectively the back plate 10 and a front plate or closure member 16. Said front plate is adapted to be clamped firmly against the gasket 15 of the adjacent ring 14$^b$ by a hand wheel 17 threaded onto the outer end of a bar 18 mounted upon the back plate 10 and extending horizontally therefrom through the face plate 16. The back plate 10, the face plate 16, the sealing rings 14, 14$^a$, 14$^b$ and the tire cores 12 are thus adapted to form a fluid-tight inner chamber 19. 20, 21 are fluid pipes communicating through the back plate 10 with the interior of said chamber and adapted respectively to supply fluid thereto and conduct it therefrom, the pipe 21 being positioned at the bottom of the inner chamber. 20$^a$ and 21$^a$ are throttling valves mounted in said pipes respectively.

Each of the cores 12 is formed with an aperture 22, extending through its tongue from its inner periphery to its annular cavity, and a similar aperture 23 diametrically opposite thereto, so that when one is at the lowermost part of the vertically suspended core the other aperture will be at or near the uppermost part of the core. 24 is a manifold vent pipe mounted through the back plate 10 and provided with relatively small, flexible branch pipes or nipples 25, 25 adapted to be inserted into the annular cavities of the several cores 12 with a sliding fit through the lower apertures 23 and to extend to the lowermost regions of the core cavities. Said vent pipe 24 is provided outside said chamber with a throttling valve 24$^a$.

26 is a cylindrical outer shell mounted upon the back plate 10, its outer end being provided with a collar 27 formed with interrupted female threads 27$^a$, adapted to secure in place an outer closure member 28 formed with interrupted male threads 29. The said closure member 28, in conjunction with the shell 26 and the back plate 10 thus form a fluid-tight outer chamber 30 inclosing the inner chamber 19 formed by the back plate 10, sealing rings 14, tire cores 12 and inner face plate 16.

31 is a fluid pressure supply pipe communicating with said outer chamber 30 through the back plate 10, and 32 is a vent pipe leading from the floor of the outer chamber 30, said pipes being provided, outside said chamber, with throttling valves 31ª, 32ª respectively.

In the operation of the device the cores 12 with the tires 13 thereon are mounted alternately with the bead sealing rings 14, 14ª, 14ᵇ upon the beams 11 as shown in Fig. 1, and the closure members 16 and 28 are secured in place as there shown. Air pressure sufficient to prevent "blowing" of the rubber of the tires may be applied to the outer chamber 30 through the pipe 31 and steam admitted to the inner chamber 19 through the pipe 20. Air may be vented from the inner chamber through the pipe 21. As the steam pressure builds up in the inner chamber the steam enters the hollow cores through the holes 22 near the top thereof and the valve 24ª is opened to permit the steam to circulate in the core cavities and to drive air and water of condensation therefrom through the nipples 25. Heat is thus applied initially to the inner plies of the tires, partially vulcanizing the same, and the tires thereafter may be vulcanized in ordinary molds without undue distortion of the fabric by the pressure of the molds. During the preliminary vulcanization in the apparatus here shown, the flow of steam to the core cavities and its pressure therein may be controlled by regulation of the valves 20ª and 24ª. Water of condensation within the tire core, gathering at the lowermost part of the cavity, is driven out through the nipples 25 in advance of the steam, and by regulation of the valve 24ª the core cavities can be kept substantially free from water with very little loss of steam through said valve. Likewise water of condensation in the inner chamber 19 is driven or drained off through the pipe 21, the valve 21ª being regulated to permit the escape of such water with a minimum loss of steam.

As the bead-sealing rings 14 engage only the bead portions of the tires, substantially all of the vulcanizing heat imparted to the tire is applied to its inner surface through the walls of the hollow cores, the heat conductivity of the air, which surrounds the body of the tire, being relatively small. The core being supported in a vertical plane, the water of condensation therein promptly runs to the lowest part of the core cavity and is driven out through the nipple 25, while the injection of the steam at the top of the core insures an effective circulation.

This apparatus obviously may be used for other methods of vulcanizing, and if steam is applied to the outer chamber, for example, water of condensation may be vented through the pipe 32. It will also be apparent that steam traps of the usual construction may readily be attached to the pipes 24, 21 and 32, to permit the discharge of water although closing against the passage of steam.

Figure 3:
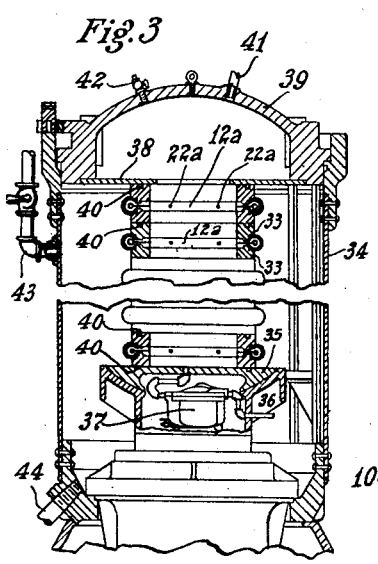
Fig. 3 is a vertical section showing a modification.

In the modification shown in Fig. 3, a pair of bead clamping rings, 33, 33 is provided for each tire and core, and said rings, with the tires and cores mounted therein, are stacked in a vertical vulcanizer or heater-press 34, upon a tiltable platform 35, mounted upon the ram 36 in ball-and-socket relation therewith. 37 is a steam trap carried by the ram and adapted to withdraw water of condensation from the inner chamber formed by the stack of tires and to discharge it into the outer chamber of the vulcanizer but automatically to close against the passage of steam. 38 is an annular plate secured and sealed to the annular base of the vulcanizer cover 39 and adapted to abut the top of the stack of bead clamping rings 33 to seal off the inner chamber formed by said stack from the outer regions or chamber of the vulcanizer, gaskets 40, 40 being mounted between said plate and the uppermost clamping ring, between the lowermost clamping ring and the platform 35, and between adjacent pairs of clamping rings. 41 is a pipe mounted through the cover 39 and adapted to apply fluid pressure to the inner chamber and 42 is a petcock in said cover adapted to vent said chamber. 43 and 44 are pipes communicating respectively with the upper and lower regions of the outer chamber and adapted to circulate fluids therethrough.

In this modification the cords 12ª, 12ª preferably are formed with several perforations 22ª, 22ª, through their annular bases, to apply steam at the same time to all parts of the core cavity, and the nipples 23 of Fig. 1 may be omitted, as any water of condensation in the core cavity is distributed around the core and is kept at approximately the temperature of the steam, while the heat from the steam readily flows, cross-sectionally around the core wall, the short distance necessary to reach all parts of the tire's inner surface.

Further modifications may be resorted to without departing from the scope of my invention and I do not wholly limit my claims to the specific constructions and procedures shown and described.

I claim:

1. The method of vulcanizing pneumatic tires which comprises applying heat to the inner surface of a tire whose outer surface is exposed, and applying a cooling fluid to the outer surface of the tire.

2. The method of vulcanizing pneumatic tires which comprises applying heat without pressure to the inner surface of a tire whose tread portion is exposed, and applying a cooling fluid to said tread portion of the tire.

3. The method of vulcanizing pneumatic tires which comprises applying heat without pressure to the inner surface of a tire whose tread portion is exposed, and applying compressed air to said tread portion of the tire.

4. The method of vulcanizing pneumatic tires which comprises mounting the tire upon a hollow core, with its outer body surface exposed, sealing the bead portions of the tire against said core, applying a heating fluid to the interior of said core, and applying fluid under pressure to the outer surface of said tire.

5. The method of vulcanizing pneumatic tires which comprises mounting the tire upon a hollow core with its tread portion exposed, sealing the bead portions of the tire against said core, applying steam to the interior of said core, and applying compressed air to the tread portion of said tire.

6. The method of vulcanizing pneumatic tires which comprises assembling a plurality of tires in axially alined relation with their beads sealed and their treads exposed to form a chamber, establishing different fluid pressures on the interior and exterior respectively of said chamber, and applying heat to said tires.

7. The method of vulcanizing pneumatic tires which comprises mounting said tires upon hollow cores, assembling a plurality of tires so mounted in axially alined relation, closing the interstices between adjacent tires to form a chamber while leaving the tread portions exposed, sealing the bead portions of each tire against its core, and applying a heating fluid to said chamber and to the interior of said cores.

8. The method of vulcanizing pneumatic tires which comprises assembling a plurality of tires in axially alined relation, closing the interstices between successive tires to form a chamber while leaving the tread portions exposed, sealing off the inner surfaces of the tires from said chamber, applying steam to said chamber, and applying compressed air to the outer surfaces of said tires.

9. Apparatus for vulcanizing pneumatic tires comprising means for supporting a tire in a substantially upright position, means for injecting steam into the space within said tire at a high part thereof, means for applying a different fluid pressure to the outer surface of said tire and means for removing water of condensation from the lowermost part thereof.

10. Apparatus for vulcanizing pneumatic tires comprising means for supporting a tire in a non-horizontal position, means for injecting steam into the space within said tire at a high part thereof, means for removing water of condensation from the lowermost part thereof, and means for applying a different fluid pressure to the outer surface of said tire.

11. Apparatus for vulcanizing pneumatic tires comprising means for supporting a plurality of tires, means for sealing the interstices between adjacent tires to form a chamber, means for closing the ends of said chamber, means for introducing fluid into said chamber, and means for removing liquid from the lowermost part of the annular space within each tire.

12. Apparatus for vulcanizing pneumatic tires comprising a plurality of hollow tire cores formed with fluid inlets through their inner peripheries, means for supporting said cores, means for sealing the interstices between said cores to form a chamber, means for closing the ends of said chamber, and means for removing liquid from the lowermost part of each core.

13. Tire vulcanizing apparatus comprising a plurality of tire cores and annular bead-molding members adapted to be assembled between said cores and terminating short of the tread portions of the tires so as to leave said tread portions exposed, said cores and members forming an inner chamber.

14. Tire vulcanizing apparatus comprising a pressure receptacle, a plurality of tire cores, and annular bead-molding members adapted to be assembled between said cores and terminating short of the tread portions of the tires so as to leave said tread portions exposed, said cores and members forming an inner chamber.

15. Vulcanizing apparatus comprising a plurality of hollow tire cores formed with fluid inlets through their inner peripheries, and a plurality of annular members adapted to be assembled alternately with said cores to form a chamber and to engage the bead portions of tires mounted on said cores and terminating short of the tread portions so as to leave the latter exposed.

16. Apparatus for vulcanizing pneumatic tires comprising means for supporting a plurality of tires in non-horizontal planes and in axially alined positions, means for sealing the interstices between the beads of adjacent tires to form a chamber, means for closing the ends of said chamber, means for injecting steam to said chamber, and means for removing water of condensation from the lowermost part of the annular space within each tire.

17. Apparatus for vulcanizing pneumatic tires comprising a plurality of hollow tire cores formed with fluid openings in their bases, means for supporting said cores in non-horizontal and axially alined positions, means for sealing the interstices between said cores to form a chamber, means for closing the ends of said chamber, means for injecting steam into said chamber and a set of nipples adapted to be inserted into the core cavities through said fluid openings and to vent water of condensation from the lowermost parts of said cavities.

18. Apparatus for vulcanizing pneumatic tires comprising a fluid pressure chamber, means for supporting a plurality of tires within said chamber in non-horizontal planes and in axially alined positions, means for sealing the interstices between adjacent tires to form an inner chamber within the aforesaid chamber, means for closing the ends of said inner chamber and means for removing water of condensation from the lowermost part of the annular space within each tire.

19. Apparatus for vulcanizing pneumatic tires comprising a fluid pressure chamber, a plurality of hollow tire cores formed with fluid openings in their bases, a support in said chamber adapted to hold said cores in axially alined, non-horizontal positions, a plurality of annular members adapted to be assembled alternately with said cores to form an inner chamber, means for sealing off said inner chamber within the aforesaid chamber, means for injecting steam into said inner chamber, and a manifold vent pipe extending into said inner chamber having flexible nipples adapted to be inserted into each core and to extend to the bottom of the core cavities.

20. In vulcanizing apparatus for pneumatic tires the combination of a fluid pressure chamber, a plurality of hollow tire cores formed with fluid openings in their bases and a plurality of annular members adapted to be assembled alternately with said cores to form an inner chamber and to engage substantially the bead portions only of tires mounted on said cores.

21. Apparatus for vulcanizing tires comprising means for supporting a plurality of annular tire-molding members in substantially horizontal axial alinement to form a chamber, a closure member for said chamber, and means for clamping said closure member in closing position.

22. Vulcanizing apparatus comprising a plate, a beam extending from said plate, a plurality of annular members hung upon said beam to form a chamber, a bar extending from said plate through said annular members, and a closure member for said chamber mounted upon said bar.

23. Apparatus for vulcanizing pneumatic tires comprising a vertical back plate, a horizontally extending shell mounted on said plate, a closure member adapted to close and seal the outer end of said shell, a bar mounted upon said back plate and a closure member adjustably mounted upon said bar.

In witness whereof I have hereunto set my hand this 31st day of March, 1921.

JOHN R. GAMMETER.